US012664148B2

(12) United States Patent
Pande et al.

(10) Patent No.: US 12,664,148 B2
(45) Date of Patent: Jun. 23, 2026

(54) DCF-INFORMED ACCESS CONTROL FOR DATA FUSION IN EDGE ENVIRONMENTS

(71) Applicant: Dell Products L.P., Round Rock, TX (US)

(72) Inventors: Pankaj Pande, Carlingford (AU); Stephen J Todd, North Andover, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/777,290

(22) Filed: Jul. 18, 2024

(65) Prior Publication Data

US 2026/0023737 A1     Jan. 22, 2026

(51) Int. Cl.
*G06F 16/23*        (2019.01)
*G06F 16/2455*      (2019.01)

(52) U.S. Cl.
CPC .... *G06F 16/2365* (2019.01); *G06F 16/24568* (2019.01)

(58) Field of Classification Search
CPC ......................... G06F 16/2365; G06F 16/2456

USPC ......................................................... 707/690
See application file for complete search history.

(56) References Cited

U.S. PATENT DOCUMENTS

| | | | |
|---|---|---|---|
| 10,049,136 B1 * | 8/2018 | Barsness | ........... G06F 16/24568 |
| 2017/0269911 A1 * | 9/2017 | Barsness | .................. G06F 8/20 |
| 2024/0086268 A1 * | 3/2024 | Bivans | ................. G06F 11/076 |

* cited by examiner

*Primary Examiner* — Ajay M Bhatia
*Assistant Examiner* — Lauren Zannah Ganger
(74) *Attorney, Agent, or Firm* — Workman Nydegger

(57)           ABSTRACT

A computing system may receive a data stream from a plurality of data sources of an edge environment. The computing system may identify a confidence score associated with each data stream received from the plurality of data sources. The computing system may, based on the associated confidence score, determine a confidence level of each data stream received from the plurality of data sources. The computing system may select the data streams received from the plurality of data sources having a first specified confidence level. The computing system may perform a data fusion process on the data streams having the first specified confidence level to generate a fused data stream that is an aggregation of the data streams having the first specified confidence level.

20 Claims, 7 Drawing Sheets

300

300

300

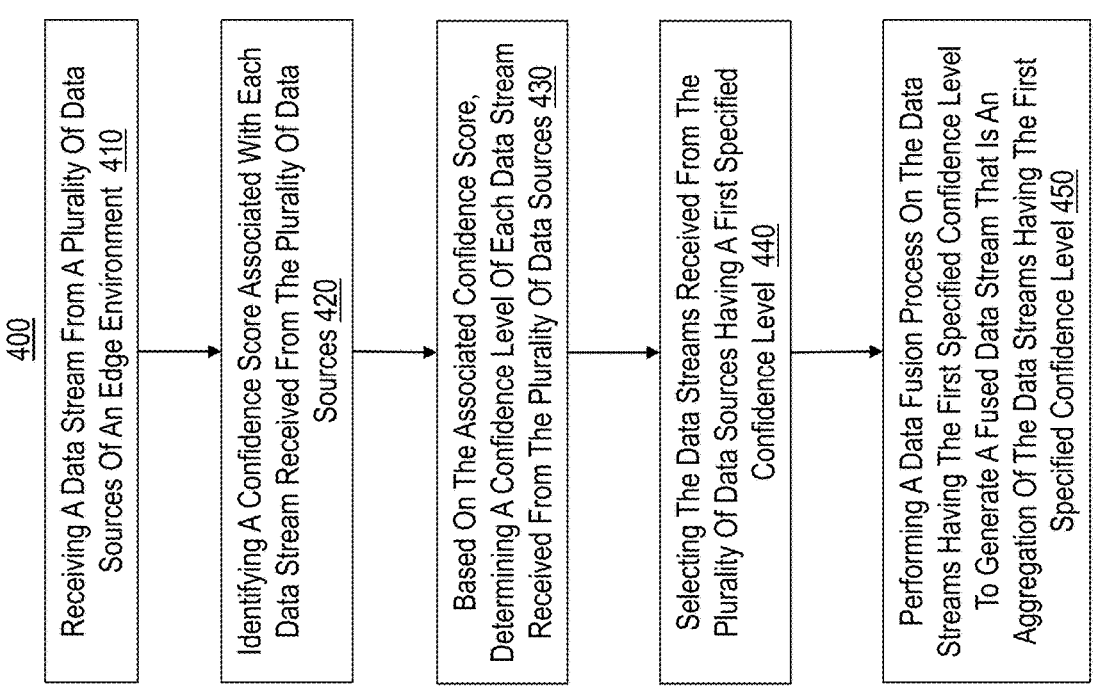

400

Receiving A Data Stream From A Plurality Of Data Sources Of An Edge Environment 410

Identifying A Confidence Score Associated With Each Data Stream Received From The Plurality Of Data Sources 420

Based On The Associated Confidence Score, Determining A Confidence Level Of Each Data Stream Received From The Plurality Of Data Sources 430

Selecting The Data Streams Received From The Plurality Of Data Sources Having A First Specified Confidence Level 440

Performing A Data Fusion Process On The Data Streams Having The First Specified Confidence Level To Generate A Fused Data Stream That Is An Aggregation Of The Data Streams Having The First Specified Confidence Level 450

Figure 4

DCF-INFORMED ACCESS CONTROL FOR DATA FUSION IN EDGE ENVIRONMENTS

TECHNOLOGICAL FIELD OF THE DISCLOSURE

Embodiments disclosed herein generally relate to generally relate to data confidence fabric networks and data delivery in data confidence fabric networks. More particularly, at least some embodiments relate to systems, hardware, software, computer-readable media, and methods for using higher confidence data in data fusion in an edge environment.

BACKGROUND

Computing and other electronic devices come in a variety of types and form factors and have varying capabilities. Many of these devices generate data that may be used by various applications. There is often a question, however, about the value of the data or the confidence that an application can place in the data. In other words, applications benefit from using data in which there is high confidence. Applications that execute using data associated with high confidence levels typically generate more reliable results and outputs.

Applying trust services or functions to data allows applications or users to trust the data and can improve the confidence in how the data is used and in the results of using the data. Providing trust services or functions, however, is not without cost.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings.

FIG. 4 discloses aspects of a method according to one embodiment; and

DETAILED DESCRIPTION OF SOME EXAMPLE EMBODIMENTS

Figure 1:
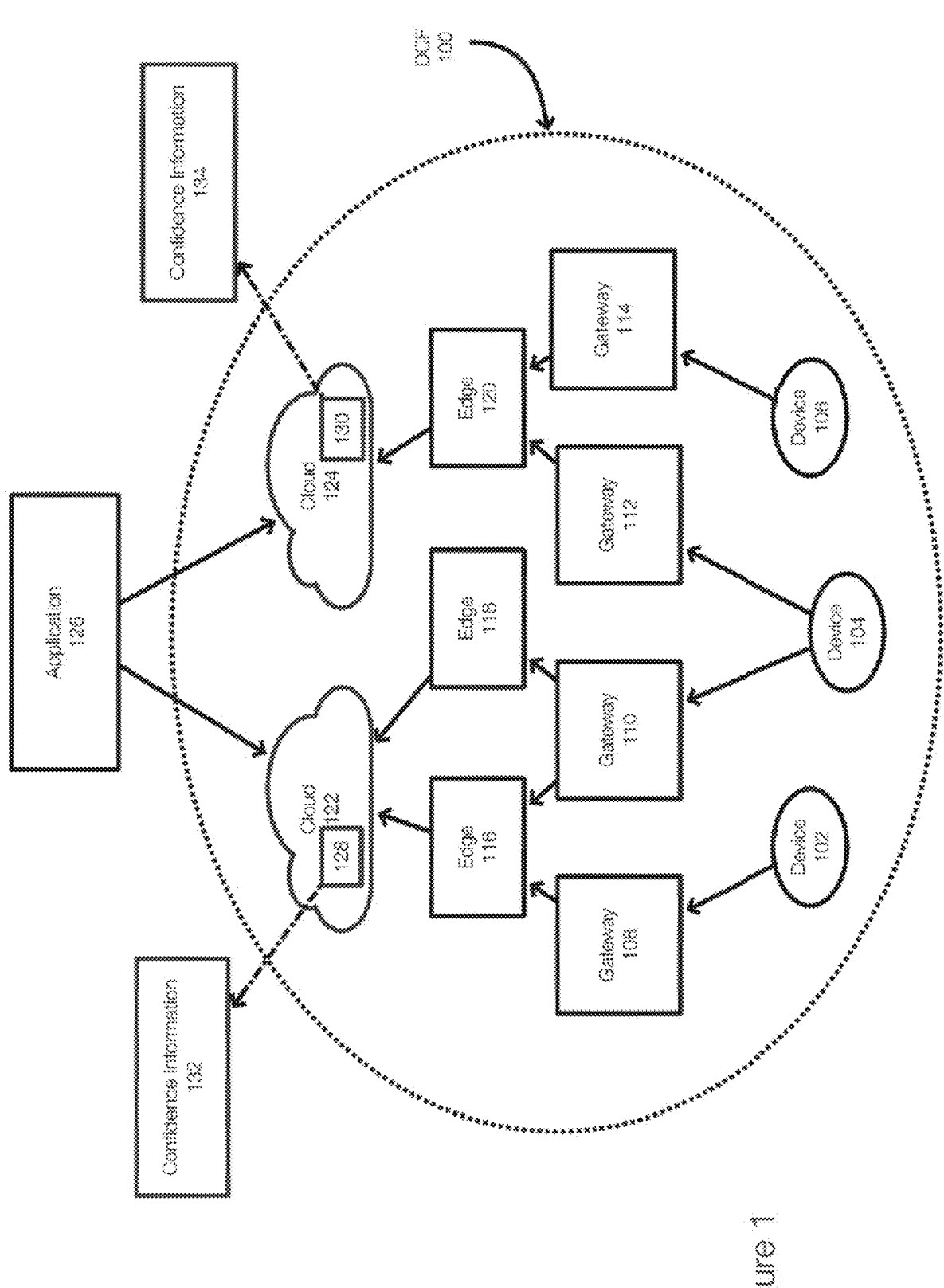
FIG. 1 discloses aspects of a computing system such as a data confidence fabric network.

Embodiments disclosed herein generally relate to generally relate to data confidence fabric networks and data delivery in data confidence fabric networks. More particularly, at least some embodiments relate to systems, hardware, software, computer-readable media, and methods for using higher confidence data in data fusion in an edge environment.

In one example embodiment, a computing system may receive a data stream from a plurality of data sources of an edge environment. The computing system may identify a confidence score associated with each data stream received from the plurality of data sources. The computing system may, based on the associated confidence score, determine a confidence level of each data stream received from the plurality of data sources. The computing system may select the data streams received from the plurality of data sources having a first specified confidence level. The computing system may perform a data fusion process on the data streams having the first specified confidence level to generate a fused data stream that is an aggregation of the data streams having the first specified confidence level.

Embodiments, such as the examples disclosed herein, may be beneficial in a variety of respects. For example, and as will be apparent from the present disclosure, one or more embodiments may provide one or more advantageous and unexpected effects, in any combination, some examples of which are set forth below. It should be noted that such effects are neither intended, nor should be construed, to limit the scope of the claims in any way. It should further be noted that nothing herein should be construed as constituting an essential or indispensable element of any embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment is that an embodiment may provide data for performing a data fusion process based on data confidence levels, thus ensuring that higher confidence data is during the data fusion process. In an embodiment, a confidence threshold is configurable to ensure the proper amount of higher confidence data is used during the data fusion process. This leads to more accurate insights and decision-making based on the fused data. Various other advantages of one or more example embodiments will be apparent from this disclosure.

A. ASPECTS OF AN EXAMPLE DATA CONFIDENCE FABRIC (DCF)

Embodiments of the present invention generally relate to computing systems or ecosystems such as data confidence fabrics (DCFs). In one example, a DCF is a system or network of hardware (e.g., computers, servers, routers, network interface cards, storage including immutable storage and/or other hardware) that is provisioned (e.g., with software, services) to score or rank data that may be ingested into and/or transmitted through the DCF. Communications in a DCF may include wired (e.g., ethernet) and/or wireless communications. The data ingested into the DCF can be made available to applications, which may also be part of the DCF. The applications can leverage the confidence scores of the data.

In some example embodiments, applications or other data sources may generate and/or share data with other applications or users. Trust in this data can be improved by joining a DCF that is configured to perform trust functions to or on the data. These trust functions (e.g., trust insertion technologies) may be provided by various providers and may be hardware based and/or software based.

A DCF may include an interface system. Applications may access the interface system using, for example, an API (Application Programming Interface). The interface system may be configured to provide publishing functionality and payment as a service functionality such that trust providers can charge a fee for use of their trust functions or trust insertion technologies. In one example, a smart contract may be used to facilitate these publishing and payment operations. In one example, payment may be collected when annotations, which reflect trust functions that have been applied to the data, are written to a distributed ledger. Thus, the payment as a service provided by the DCF is coupled with or relates to the act or step of publishing annotations to a distributed ledger. In another example, the act or step of providing payment as a service may be decoupled from the act or step of publishing trust information.

A DCF is generally configured to add or associate annotations to data. The annotations include confidence information, which can take various forms including a confidence score, trust information, and/or associated metadata. The confidence information can be added from a hardware perspective and/or a software perspective.

A DCF, by way of example only, may be an architecture and set of services that allow data to be ingested and used by applications. The DCF may include or be associated with trust insertion technologies (hardware and/or software) that are applied to the data as the data flows through the DCF. Each time a trust insertion technology is applied, an annotation may be made in a ledger or other structure and the confidence score of the data may be changed. Thus, the confidence score of data provides a view into the trustworthiness of the data to an application. Trust or confidence information can be added from both hardware and software perspectives. Data may be associated with an overall confidence score. In addition, a confidence score may be generated for each trust insertion technology. This allows an application, for example, to evaluate how to trust the data in the context of a specific trust insertion technology.

The trust insertion technologies may be applied by performing trust functions. Further, each of the trust insertion technologies may be associated with a trust provider.

A DCF may include various interconnected hardware environments (e.g., nodes). These nodes may have varying hardware capabilities that are examples of trust insertion technologies or hardware-assisted trust insertion technologies. The hardware is configured, such that as data flows from data sources to storage or to applications in a DCF system, scores or confidence information or other annotations can be attached to or associated with the data. As the data is handled by various forms of trust insertion technologies, the overall score or ranking (e.g., a confidence or trustworthiness score) of the data may change. The data scored or ranked in the DCF system may be stored in various locations, such as a data lake, in a datacenter, Public Cloud data storage service, or the like. The annotations, which may include confidence information, a confidence score and/or rank, is made available to one or more applications or other clients or users. The confidence information may include, in addition to a confidence score and/or rank, tables, audit information, and the like.

Confidence scores, which may be determined from hardware aspects and/or software aspects of a DCF, allow an application to explore or exploit the data for potential analysis or consumption. The confidence score or rank of the data allows an application to understand or account for the trustworthiness of the data. For example, the confidence score of the data may have an impact on whether the data is actually used by the application. An application may require a minimum confidence score or have other requirements related to the confidence score.

For example, an application operating in a nuclear facility may need to use data that are very trustworthy (have a high confidence score) while data that is used by an application to control lights in a home may not need to be as trustworthy (a lower confidence score is acceptable). In the context of a nuclear facility, an application may require that the hardware handling the data be firewalled from outside sources, provide hardware assisted encryption, deterministic routing, or the like or combination thereof while data used to control lights may not require these trust services. The trust functions required or desired by an application can be specified and the DCF may perform these trust functions when available. The payment as a service allows payment to be made for each trust function that is performed, each time annotations are committed to a distributed ledger, or the like.

Note that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

FIG. 1 illustrates an example of a data confidence fabric network (DCF 100). The DCF 100 includes varies computing and hardware components, connections, and environments. The DCF 100 is configured to add confidence information including confidence scores to data flowing in the DCF 100.

FIG. 1 illustrates examples of data routes or paths in the DCF 100. A specific path of specific data may be referred to as a graph. In FIG. 1, data generated by devices 102, 104, and 106 may flow through multiple levels or multiple hardware environments such as gateways 108, 110, 112, and 114, edge nodes 116, 118, 120, and clouds 122 and 124. In one example, the data may be stored in the clouds 122 and 124.

As the data 128 and the data 130 flow through the DCF 100, the DCF 100 may add annotations (e.g., confidence information) to the data. After flowing through the DCF 100, the data 128 (which may have been generated by one of the devices 102, 104, and/or 106) is stored in the cloud 122 and made available to an application 126. Similarly, the data 130 may be made available to the application 126. Alternatively, the data 128 and 130 are delivered directly to the application 126. The data 128 is associated with confidence information 132 and the data 130 is associated with confidence information 134. The confidence information 132 and 134 may include confidence scores, provenance data, audit trails, data graphs, applied trust insertion technologies or trust functions, or the like. Data flowing through a DCF is typically more valuable and useful at least because the confidence scores or ranks of DCF annotated data allow an application to decide how to trust and/or use the associated data.

Figure 2:
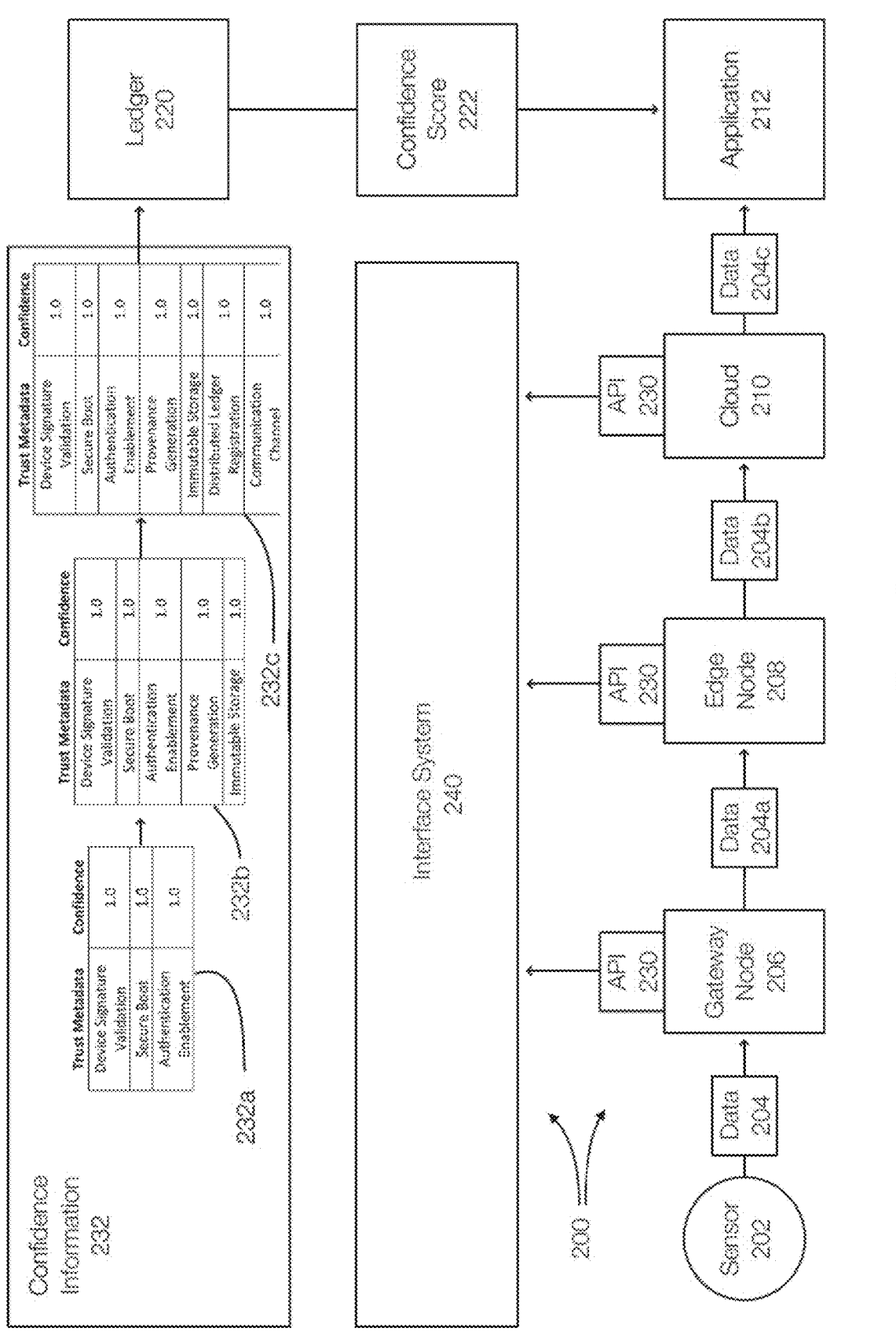
FIG. 2 discloses additional aspects of a computing system such as a data confidence fabric network.

FIG. 2 discloses additional aspects of a data confidence fabric network. FIG. 2 illustrates a DCF 200, which is an example of the DCF 100. In the DCF 200, data 204 is generated by a sensor 202 (or other devices such as user devices) and is ingested into the DCF 200. The data 204 may be received at a gateway node 206, which interfaces with an interface system 240 of the DCF 200 to annotate the data 204 with confidence information.

As illustrated in FIG. 2, confidence information 232 (also referred to as "trust metadata") is generated and accompanies the data 204 as the data 204 is routed in the DCF 200. At the gateway node 206, which may have an embedded Intel TPM chip and the gateway node may use that chip to perform "trust services" on behalf of the owner of the data 204, the data 204 is annotated with confidence information 232a, which relates to trust insertion technologies such as a device signature validation, a secure boot, and an authentication enablement. For example, a "secure boot" annotation, in the confidence information 232a for the gateway node 206, may indicate that the gateway node 206 has not been tampered with. The TPM chip may also provide keys used to perform signature services on the data 204. Each of these trust insertion technologies, in this example, are performed and add a score that is reflected in the confidence information 232a. More specifically, the gateway node 206 may access an interface system 240, which may be a DCF SDK (software development kit), using an application programming interface (API) 230, which is an example of a DCF driver, to record the confidence information 232a. The data 204 and the annotations or confidence information may be transmitted together or maintained separately.

Next, the data 204a (which is the annotated data 204 after passing through the gateway node 206) is routed to an edge node 208 and additional confidence information is added as reflected in the confidence information 232b. Thus, the data 204a arrives at the edge node 208 and is already associated with the confidence information 232a. The edge node 208 may add apply additional trust insertion technologies such as provenance generation and immutable storage. These trust insertion technologies allow the confidence information to be augmented as illustrated by the confidence information 232b. Thus, the data 204b leaving the edge node 208 is associated with the confidence information 232b. In one embodiment, in the example of FIG. 2, the edge node 208 may leverage an ARM secure enclave to perform a "trust service," inspecting the data 204a and performing analytics on it Next, the data 204b arrives at the cloud 210 and additional confidence information is added as illustrated by the confidence information 232c. Thus, the cloud 210 may apply or use a trust insertion technology such as distributed ledger registration and the confidence information 232 is updated as shown by the confidence information 232c.

In one example, the confidence information 232 is stored in a ledger 220. As a result, the confidence information 232 is secure and can be accessed by an application 212. In this example, the data 204 arrives at the application 212 as the annotated data 204c, which is associated with the annotations or confidence information 232c and with a confidence score of, in this example, 7.0. In this example, the confidence information 232c includes confidence information related to the communication channel and the associated score of 1.0 may reflect that the selection, performance, and operation of a selected communication channel was as expected and used to deliver the data 204c. The application 212 thus has insight into the trustworthiness of the data 204 generated at the sensor 202 and has insight into the communication channel.

The confidence score can be generated in different ways. The various trust insertion technologies may be weighted or have different scores. For example, the DCF 200 may be associated with a maximum confidence score (e.g., 10). If the data 204 had followed a different route in the DCF 200, the confidence score may be different. For example, other nodes may have trust insertion technologies that could have increased the confidence score of the data 204. Different routes may also result in lower confidence scores.

C. DCF-INFORMED ACCESS CONTROL SYSTEM

C.1 Discussion of Aspects of an Example Embodiment

Figure 3A:
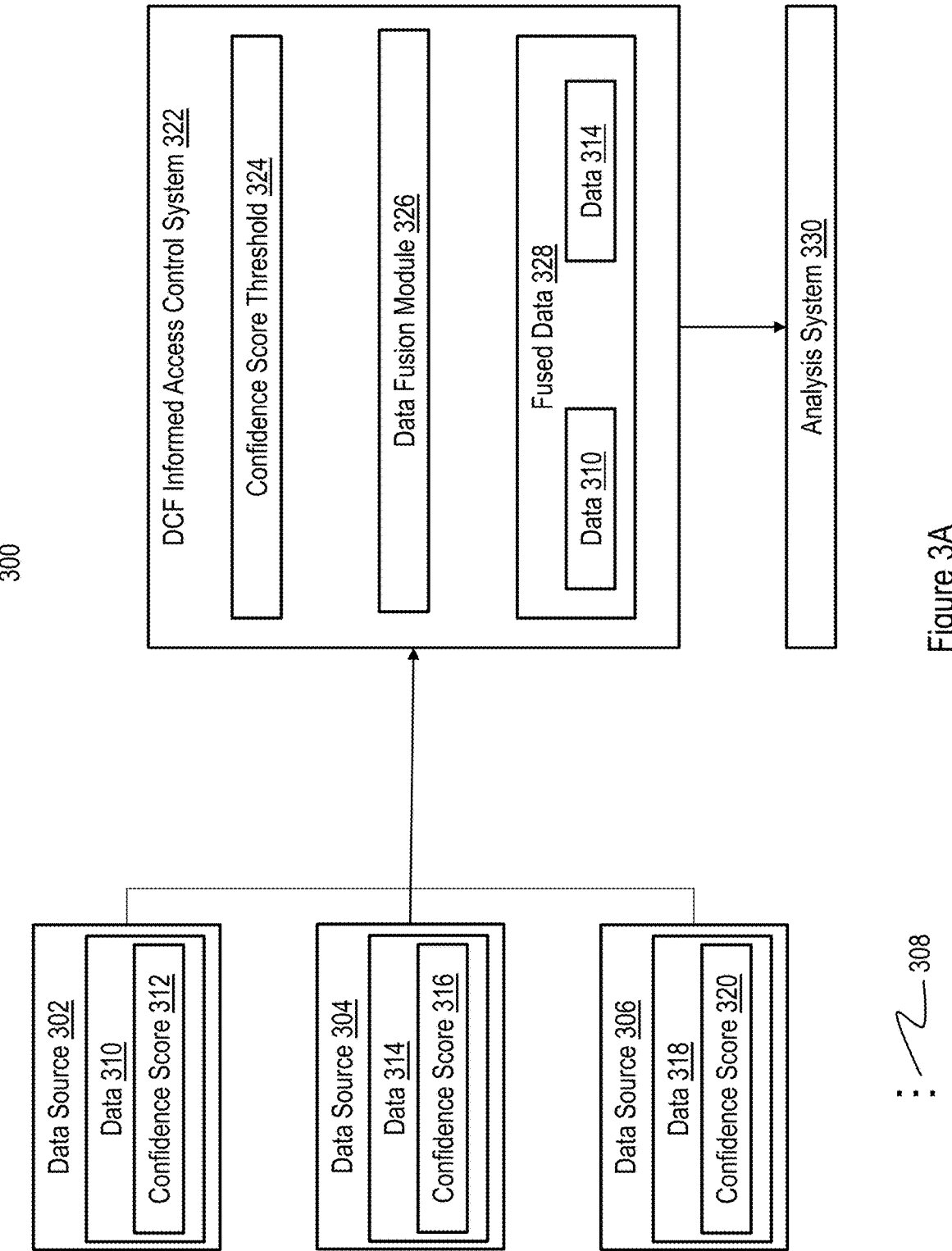
FIGS. 3A-3C disclose aspects of performing a data fusion process in a computing system such as a data confidence fabric network.

With attention now to FIG. 3A, an example architecture 300 according to one embodiment is disclosed. As shown, the architecture 300 may comprise a group of data sources such as data sources 302, 304, and 306, such as edge entities, for example, that are configured to communicate with each other. The ellipses illustrate that there can be any number of additional data sources 308 as circumstances warrant. Each of the data sources may comprise, for example, IoT (internet of things) devices, sensors, user inputs, autonomous vehicles, and/or any other entity(s), any of which may comprise hardware and/or software, that is/are operable to collect and/or generate data. The data sources may also be a data consumer, that is, a data source may receive data from one or more other data sources, and may process, store, and/or transmit, that data.

In an embodiment, each of the data sources 302-308 may comprise a respective node of a DCF, such as DCF 100 or 200 previously described, such that data may be generated by the data sources 302-308. For example, the data source 302 generates data 310, the data source 304 generates data 314, and the data source 306 generates data 318. Although not illustrated, the additional data sources 308 may also generate data.

In an embodiment, each of the data sources 302-308 assigns respective confidence scores to the data that passes through it or is otherwise handled by it. For example, the data source 302 assigns a confidence score 312 to the data 310, the data source 304 assigns a confidence score 316 to the data 314, and the data source 306 assigns a confidence score 320 to the data 318. Although not illustrated, the additional data sources 308 may also assign a confidence score to their associated data.

In one embodiment, the data source 302 and 304 may comprise various hardware security measures such as a Trusted Execution Environment (TEE) and a Trusted Platform Module (TPM). By comparison, the data source 306 may not include any hardware security measures. As such, the confidence score 312 assigned to data 310 coming from the data source 302 and the confidence score 316 assigned to data 314 coming from the data source 304 will be higher than the confidence score 320 assigned to data 318 coming from the data source 306. It will be appreciated that even though the confidence scores 312 and 316 are higher than the confidence score 320, the data source 302 may include more hardware or software security measures than the data source 304 such that the confidence score 312 is higher than the confidence score 316.

It is often desirable to perform data fusion on entities of an edge environment. Performing data fusion involves combining data from multiple data sources to create a more comprehensive understanding of the system. For example, if the system were a multi-sensor IoT monitoring system for a smart building, the data from various data sources such as temperature sensors and energy consumption sensors could be fused and then provided to an analysis system where the fused data could be used to optimize energy consumption and occupant comfort.

Thus, in the embodiment of FIG. 3A, it would be desirable to perform data fusion on the data 310 generated by the data source 302, the data 314 generated by the data source 304, the data 318 generated by the data source 306, and perhaps on some of the data of the generated by any additional data sources 308. However, traditional access control mechanisms for data fusion do not account for data confidence levels, which can lead to inaccuracies and false insights. That is, without taking data confidence levels into account, lower quality data might be included in the data fusion process, leading to the inaccuracies and false insights. Advantageously, the embodiments disclosed herein provide for a DCF-informed access control system 322 that helps ensure that data having a high confidence score, and thus is likely to be high quality data, is used in the data fusion process as will be explained in more detail to follow.

Accordingly, in the embodiment of FIG. 3A, the data 310, 314, and 318, and associated confidence scores 312, 316, and 320, and possibly edge-device unique identifiers, are provided by the data sources 302, 304, and 306 to the DCF-informed access control system 322. The DCF-informed access control system 322 uses the confidence scores 312, 316, and 320 to determine if the data 310, 314, and 318 is higher confidence or quality data, average confidence or quality data, or lower confidence or quality data. In the embodiment, data having a relatively high confident score would be considered higher confidence data, data having a relative average confidence score would be considered average confidence data, and data having a relatively low confidence level would be considered lower confidence data. For example, suppose in the embodiment that the confidence scores 312, 316, and 320 were assigned on a scale of 1 to 10. In such embodiment, a confidence score of 7 or higher could be considered a higher confidence score, a confidence score of 5 to 6 could be considered an average confidence score, and a confidence score lower than 5 could be considered a lower confidence score. Thus, if the confidence score 312 was 9 or higher, then the data 310 would be considered higher confidence data, if the confidence score 316 was 6, then the data 314 would be considered average confidence data, and if the confidence score 320 was 3, then the data 318 would be considered lower confidence data.

In some embodiments, the DCF-informed access control system 322 includes a configurable confidence score threshold 324. The configurable confidence score threshold 324 allows a user to set a specific confidence score that will be considered as a high confidence score, an average confidence score, and a low confidence score. For example, suppose in the embodiment that the confidence scores 312, 316, and 320 were assigned on a scale of 1 to 10. In such case, a user who desired very high confidence data when performing the data fusion process might set the configurable confidence score threshold 324 at 9, thus ensuring that only data having a confidence score of 9 or higher would be considered high confidence data. In contrast, a user who wanted a larger amount of data to be used when performing the data fusion process might set the configurable confidence score threshold 324 at 5, thus ensuring that data having a confidence score of 5 or higher would be considered high confidence data. Alternatively, the user might set the configurable confidence score threshold 324 so that any data with a confidence score of 9 or higher would be considered higher confidence data and any data with a confidence score of 5 to 9 would be considered average confidence data.

In the embodiment of FIG. 3A, suppose the confidence score 312 and the confidence score 316 are determined to be a high confidence scores, thus indicating that the data 310 and 314 is higher confidence data. In contrast, suppose the confidence score 320 is considered to be a low confidence score, thus indicating that data 318 is lower confidence data. Accordingly, the higher confidence data 310 and 314 is provided to a data fusion module 326 of the DCF-informed access control system 322. However, the lower confidence data 318 is not provided to the data fusion module 326 since it is lower confidence data. In operation, the data fusion module 326 performs a data fusion process on the higher confidence data 310 and 314. When performing the data fusion process, the data fusion module 326 may perform any reasonable data fusion method or algorithm that is configured to fuse the higher confidence data 310 and 314 into fused data. Accordingly, as shown in FIG. 3A, the data fusion module 326 generates fused data 328 that is the fusion of the higher confidence data 310 and 314. In this way, no lower confidence data is included in the fused data 328, thus helping to ensure that only higher confidence or higher quality data is part of the fused data.

The fused data 328 is provided to an analysis system 330. The analysis system 330 uses the fused data 328 to learn insights and understanding about the system that includes the data sources 302-308. For example, if the system were a multi-sensor IoT monitoring system for a smart building, the fused data from the data sources 302 and 304 such as temperature sensors and energy consumption sensors is used by the analysis system 330 to optimize energy consumption and occupant comfort.

Figure 3B:
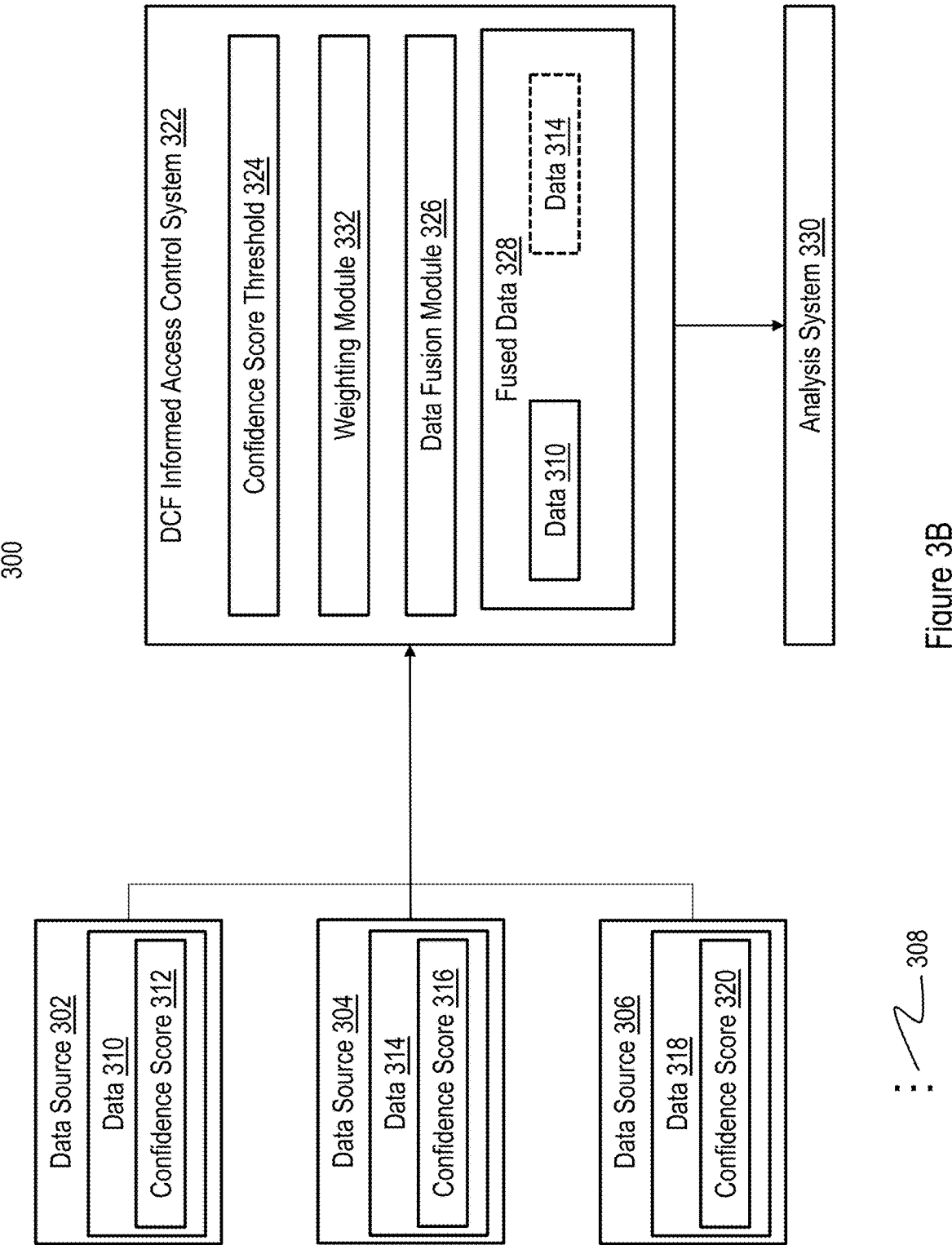

FIG. 3B includes a further embodiment of the architecture 300 of FIG. 3A. As shown in in FIG. 3B, in this embodiment the DCF-informed access control system 322 further includes a weighting module 332. In operation, the weighting module 332 allows a user to set wights for the data according to the confidence scores. For example, suppose in the embodiment that the confidence scores 312, 316, and 320 are assigned on a scale of 1 to 10. Further suppose that the confidence score 312 is 9 and thus the data 310 is considered higher confidence data, the confidence score 316 is 6 and thus the data 314 is considered average confidence data, and confidence score 320 is 3 and thus the data 318 is considered lower confidence data.

In the embodiment, the weighting module 332 can be used to specify that the higher confidence data 310 is given full weight in the fused data 328 and the average confidence data is given a lower weight in the fused data 328. Thus, when generating the fused data 328, the data fusion module 326 would weigh the higher confidence data 310 and the average confidence data accordingly. Thus, as shown in FIG. 3B, the solid line for data 310 represents that the data 310 is given full weight and the short, dashed lines for data 314 represents that the data 314 is given a lesser weighting than the higher confidence data 310 in the fused data 328. In this way, the fused data 328 that is provided to the analysis system 330 can include the average confidence data 314 that has been properly weighted so as to be less important than the higher confidence data 310.

Figure 3C:
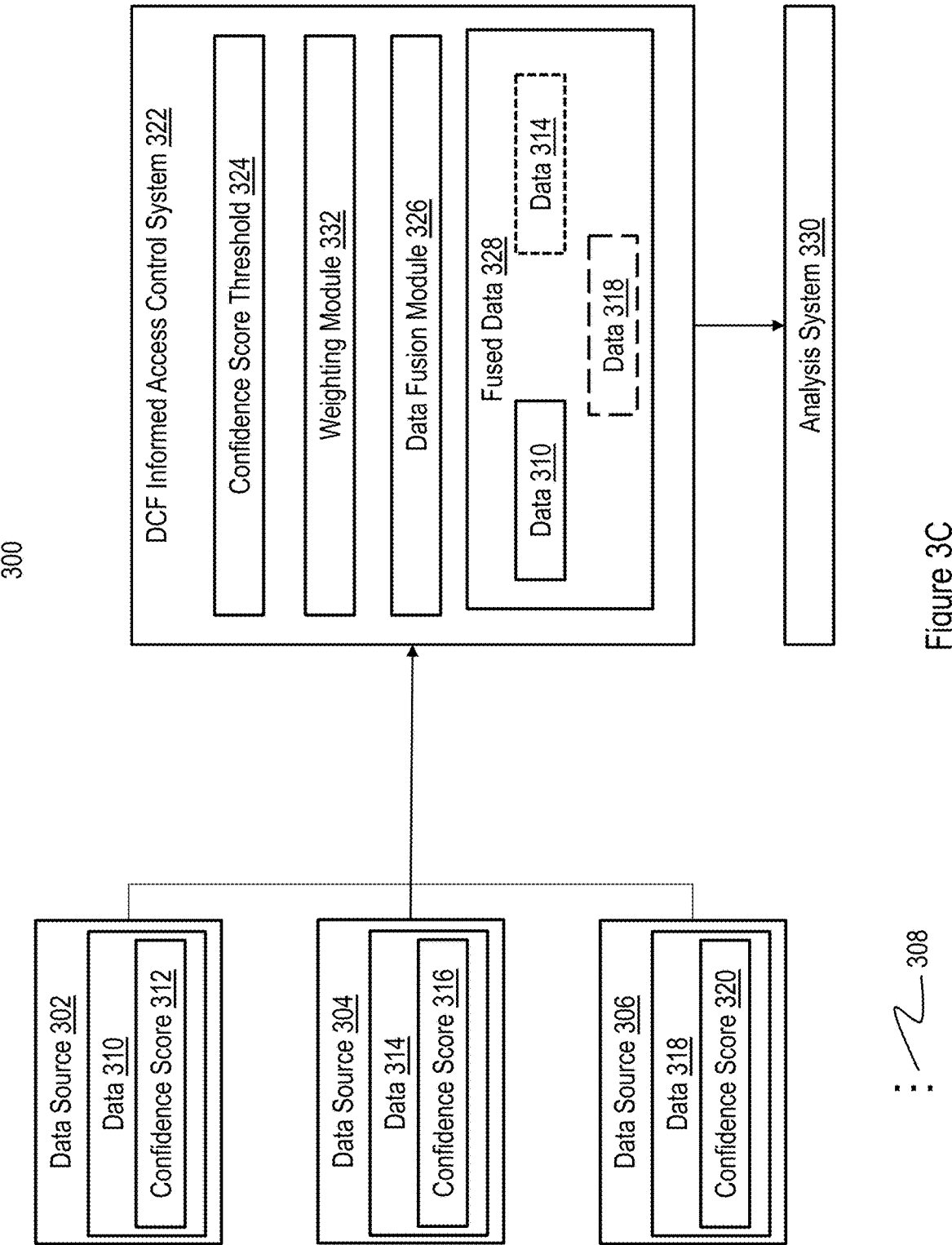

FIG. 3C includes a further embodiment of the architecture 300 of FIG. 3B. In this embodiment, the weighting module 332 is able to weight the higher confidence data 310, the average confidence data 314, and the lower confidence data 318 according to their respective confidence scores. Thus, when generating the fused data 328, the data fusion module 326 would weigh the higher confidence data 310, the average confidence data, and the lower confidence data accordingly. Thus, as shown in FIG. 3C, the solid line for data 310 represents that the data 310 is given full weight, the short-dashed lines for data 314 represents that the data 314 is given a lesser weighting than the higher confidence data 310, and the long-dashed lines for the data 318 represents that the data 318 is given an even lesser weighting than the average confidence data 314 in the fused data 328. In this way, in circumstances where there is some insights that can be found in all the data provided by the various data sources, the fused data 328 that is provided to the analysis system 330 can be weighted so that the lower confidence data is given less importance than the average confidence data and the average confidence data is given less importance than the higher confidence data.

D. EXAMPLE METHODS

It is noted that any operation(s) of any of the methods disclosed herein, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 4, an example method 400 is disclosed. The method 400 will be described in relation to one or more of the figures previously described, although the method 400 is not limited to any particular embodiment.

The method 400 includes receiving a data stream from a plurality of data sources of an edge environment (410). For example, as previously described the DCF-informed access control system 322 receives the data 310, 314, and 318 from the data sources 302, 304, and 306 respectively.

The method 400 includes identifying a confidence score associated with each data stream received from the plurality of data sources (420). For example, as previously described the DCF-informed access control system 322 identifies the confidence score 312 that is associated with the data 310, the confidence score 316 that is associated with the data 314, and the confidence score 320 that is associated with the data 318.

The method 400 includes based on the associated confidence score, determining a confidence level of each data stream received from the plurality of data sources (430). For example, as previously described the DCF-informed access control system 322 determines that the confidence score 312 is a high confidence score, therefore indicating that the data 310 is higher confidence data, that the confidence score 316 is a high confidence score or an average confidence score, therefore indicating that the data 314 is higher confidence data or average confidence data, and that the confidence score 320 is a low confidence score, therefore indicating that the data 318 is lower confidence data.

The method 400 includes selecting the data streams received from the plurality of data sources having a first specified confidence level (440). For example, as previously described, the DCF-informed access control system 322 selects the data 310 and 314 that are higher confidence data since in this embodiment the first specified confidence level is the higher confidence level.

The method 400 includes performing a data fusion process on the data streams having the first specified confidence level to generate a fused data stream that is an aggregation of the data streams having the first specified confidence level (450). For example, as previously described the DCF-informed access control system 322 performs the data fusion process on the data 310 and 314 to generate the fused data 328.

E. Further Example Embodiments

Following are some further example embodiments. These are presented only by way of example and are not intended to limit the scope of this disclosure or the claims in any way.

Embodiment 1. A method, comprising: receiving a data stream from a plurality of data sources of an edge environment; identifying a confidence score associated with each data stream received from the plurality of data sources; based on the associated confidence score, determining a confidence level of each data stream received from the plurality of data sources; selecting the data streams received from the plurality of data sources having a first specified confidence level; and performing a data fusion process on the data streams having the first specified confidence level to generate a fused data stream that is an aggregation of the data streams having the first specified confidence level.

Embodiment 2. The method as recited in embodiment 1, wherein the plurality of edge nodes comprise respective nodes of a data confidence fabric (DCF).

Embodiment 3. The method as recited in embodiments 1-2, wherein the confidence score concerns performance of hardware and/or software of each of the plurality of data sources.

Embodiment 4. The method as recited in any of embodiments 1-3, wherein the confidence level of each of the data streams received from the plurality of data sources is based on a configurable confidence score threshold.

Embodiment 5. The method as recited in any of embodiments 1-4, further comprising: providing the fused data stream to an analysis module for further analysis of the data streams included in the fused data stream.

Embodiment 6. The method as recited in any of embodiments 1-5, further comprising: selecting the data streams received from the plurality of data sources having a second specified confidence level that is lower than the first specified confidence level; and ensuring that the data streams having the second specified confidence level are not included in the data fusion process.

Embodiment 7. The method as recited in any of embodiments 1-6, further comprising: determining a first weight for the data streams having the first specified confidence level; selecting the data streams received from the plurality of data sources having a second specified confidence level that is lower than the first specified confidence level; determining a second weight for the data streams having the second specified confidence level; taking the first and second weights into account when performing the data fusion process; and generating the fused data stream that is an aggregation of the data streams having the first specified confidence level and the second specified confidence level.

Embodiment 8. A system, comprising hardware and/or software, operable to perform any of the operations, methods, or processes, or any portion of any of these, disclosed herein.

Embodiment 9. A non-transitory storage medium having stored therein instructions that are executable by one or more hardware processors to perform operations comprising the operations of any one or more of embodiments 1-7.

E. EXAMPLE COMPUTING DEVICES AND ASSOCIATED MEDIA

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that are executed on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to conduct executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
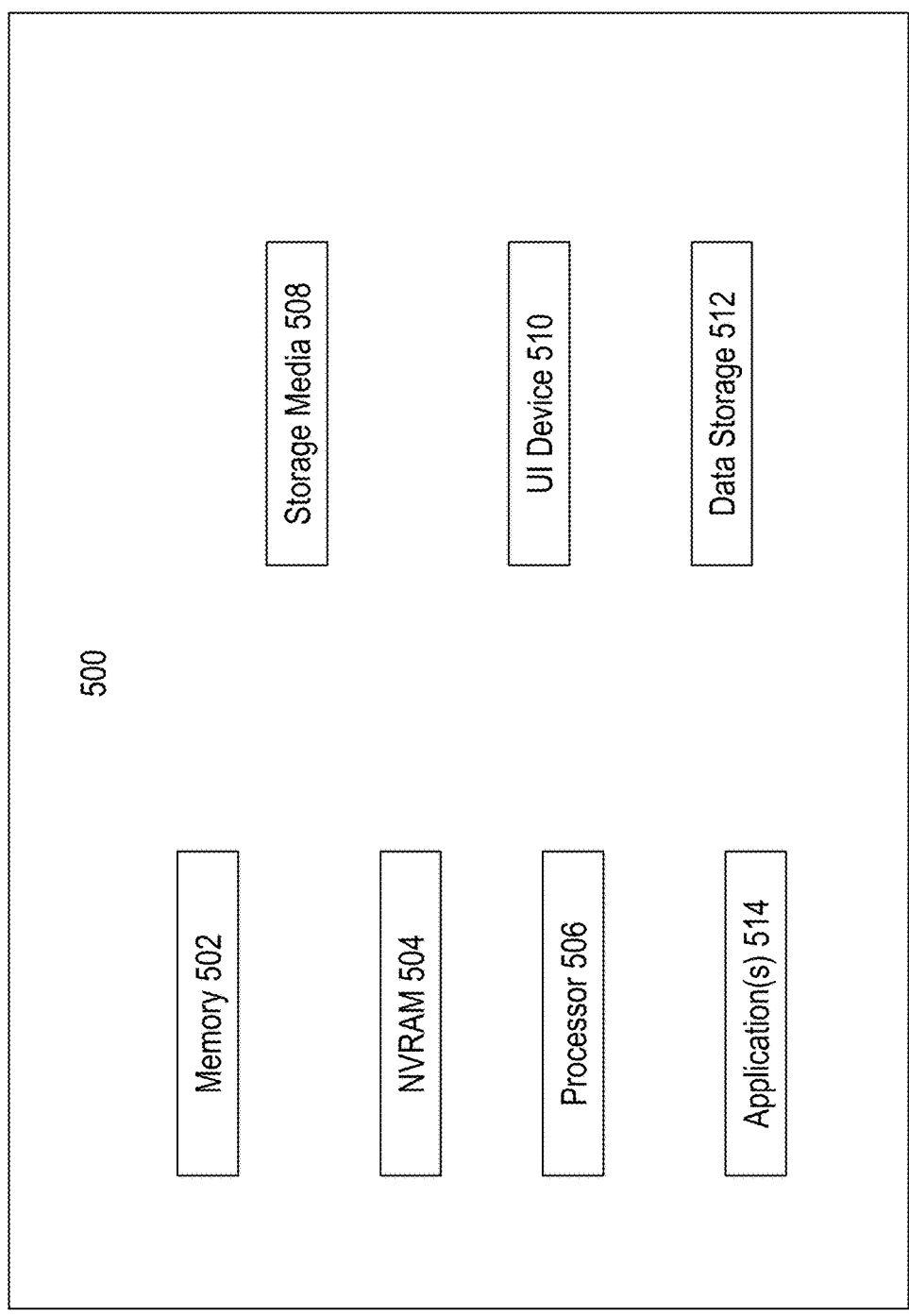
FIG. 5 discloses a computing entity configured and operable to perform any of the disclosed methods, processes, and operations.

With reference briefly now to FIG. 5, any one or more of the entities disclosed, or implied, by FIGS. 1-4, and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

receiving a data stream from a plurality of data sources of an edge environment, wherein each data source comprises a node of a data confidence fabric including hardware and software based trust insertion technologies;

applying, by the data confidence fabric as the data stream flows through multiple data confidence fabric nodes, a plurality of trust functions comprising at least one hardware based trust insertion technology selected from device signature validation, secure boot using a Trusted Platform Module (TPM), authentication enablement, and provenance generation within a secure enclave, and at least one software based trust insertion technology selected from immutable-storage registration and distributed-ledger registration, wherein each of the trust functions changes a confidence score of the data stream;

identifying the confidence score associated with each data stream received from the plurality of data sources, wherein the confidence score is based at least on the trust functions applied to the data stream as the data stream is ingested into the data confidence fabric;

based on the associated confidence score, determining a confidence level of each data stream received from the plurality of data sources;

selecting the data streams received from the plurality of data sources having a first specified confidence level; and performing, by a data fusion module, a data fusion process that combines the selected data streams into a fused data stream by aggregating values from the selected data streams and generating fused output data based on the aggregated values, to generate a fused data stream that is an aggregation of the data streams having the first specified confidence level.

2. The method of claim 1, wherein the plurality of data sources comprise respective nodes of a data confidence fabric (DCF).

3. The method of claim 1, wherein the confidence score concerns performance of hardware and/or software of each of the plurality of data sources.

4. The method of claim 1, wherein the confidence level of each of the data streams received from the plurality of data sources is based on a configurable confidence score threshold.

5. The method of claim 1, further comprising:

providing the fused data stream to an analysis module for further analysis of the data streams included in the fused data stream.

6. The method of claim 1, further comprising:

selecting the data streams received from the plurality of data sources having a second specified confidence level that is lower than the first specified confidence level; and ensuring that the data streams having the second specified confidence level are not included in the data fusion process.

7. The method of claim 1, further comprising:

determining a first weight for the data streams having the first specified confidence level;

selecting the data streams received from the plurality of data sources having a second specified confidence level that is lower than the first specified confidence level;

determining a second weight for the data streams having the second specified confidence level;

taking the first and second weights into account when performing the data fusion process; and generating the fused data stream that is an aggregation of the data streams having the first specified confidence level and the second specified confidence level.

8. A computing system comprising:

a processor;

a non-transitory storage medium having stored therein instructions that are executable by the processor that cause the computing system to perform operations comprising:

receiving a data stream from a plurality of data sources of an edge environment, wherein each data source comprises a node of a data confidence fabric including hardware and software based trust insertion technologies;

applying, but the data confidence fabric as the data stream flows through multiple data confidence fabric nodes, a plurality of trust functions comprising at least one hardware based trust insertion technology selected from device signature validation, secure boot using a Trusted Platform Module (TPM), authentication enablement, and provenance generation within a secure enclave, and at least one software-based trust insertion technology selected from immutable- storage registration and distributed-ledger registration, wherein each of the trust functions changes a confidence score of the data stream;

identifying the confidence score associated with each data stream received from the plurality of data sources, wherein the confidence score is based at least on the trust functions applied to the data stream as the data stream is ingested into the data confidence fabric;

based on the associated confidence score, determining a confidence level of each data stream received from the plurality of data sources;

selecting the data streams received from the plurality of data sources having a first specified confidence level; and performing, by a data fusion module, a data fusion process that combines the selected data streams into a fused data stream by aggregating values from the selected data streams and generating fused output data based on the aggregated values, to generate a fused data stream that is an aggregation of the data streams having the first specified confidence level.

9. The computing system of claim 8, wherein the plurality of data sources comprise respective nodes of a data confidence fabric (DCF).

10. The computing system of claim 8, wherein the confidence score concerns performance of hardware and/or software of each of the plurality of data sources.

11. The computing system of claim 8, wherein the confidence level of each of the data streams received from the plurality of data sources is based on a configurable confidence score threshold.

12. The computing system of claim 8, further comprising:

providing the fused data stream to an analysis module for further analysis of the data streams included in the fused data stream.

13. The computing system of claim 8, further comprising:

selecting the data streams received from the plurality of data sources having a second specified confidence level that is lower than the first specified confidence level; and ensuring that the data streams having the second specified confidence level are not included in the data fusion process.

14. The computing system of claim 8, further comprising:

determining a first weight for the data streams having the first specified confidence level;

selecting the data streams received from the plurality of data sources having a second specified confidence level that is lower than the first specified confidence level;

determining a second weight for the data streams having the second specified confidence level;

taking the first and second weights into account when performing the data fusion process; and generating the fused data stream that is an aggregation of the data streams having the first specified confidence level and the second specified confidence level.

15. A non-transitory storage medium having stored therein instructions that are executable by one or more hardware processors to perform operations comprising:

receiving a data stream from a plurality of data sources of an edge environment, wherein each data source comprises a node of a data confidence fabric including hardware and software based trust insertion technologies;

applying, by the data confidence fabric as the data stream flows through multiple data confidence fabric nodes, a plurality of trust functions comprising at least one hardware-based trust insertion technology selected from device signature validation, secure boot using a Trusted Platform Module (TPM), authentication enablement, and provenance generation within a secure enclave, and at least one software-based trust insertion technology selected from immutable- storage registration and distributed-ledger registration, wherein each of the trust functions changes a confidence score of the data stream;

identifying the confidence score associated with each data stream received from the plurality of data sources, wherein the confidence score is based at least on the trust functions applied to the data stream as the data stream is ingested into the data confidence fabric;

based on the associated confidence score, determining a confidence level of each data stream received from the plurality of data sources;

selecting the data streams received from the plurality of data sources having a first specified confidence level; and performing, by a data fusion module, a data fusion process that combines-on the selected data streams into a fused data stream by aggregating values from the selected data streams and generating fused output data based on the aggregated values, to generate a fused data stream that is an aggregation of the data streams having the first specified confidence level.

16. The non-transitory storage medium of claim 15, wherein the plurality of data sources comprise respective nodes of a data confidence fabric (DCF).

17. The non-transitory storage medium of claim 15, wherein the confidence level of each of the data streams received from the plurality of data sources is based on a configurable confidence score threshold.

18. The non-transitory storage medium of claim 15, further comprising:

providing the fused data stream to an analysis module for further analysis of the data streams included in the fused data stream.

19. The non-transitory storage medium of claim 15, further comprising:

selecting the data streams received from the plurality of data sources having a second specified confidence level that is lower than the first specified confidence level; and ensuring that the data streams having the second specified confidence level are not included in the data fusion process.

20. The non-transitory storage medium of claim 15, further comprising:

determining a first weight for the data streams having the first specified confidence level;

selecting the data streams received from the plurality of data sources having a second specified confidence level that is lower than the first specified confidence level;

determining a second weight for the data streams having the second specified confidence level;

taking the first and second weights into account when performing the data fusion process; and generating the fused data stream that is an aggregation of the data streams having the first specified confidence level and the second specified confidence level.

* * * * *